United States Patent
Kataoka et al.

(10) Patent No.: US 8,976,492 B1
(45) Date of Patent: Mar. 10, 2015

(54) MAGNETIC HEAD HAVING TWO DOMAIN CONTROL LAYERS FOR STABILIZING MAGNETIZATION OF THE HARD BIAS LAYER

(71) Applicant: HGST Netherlands B.V., Amsterdam (NL)

(72) Inventors: Kouji Kataoka, Odawara (JP); Takashi Wagatsuma, Odawara (JP); Katsumi Hoshino, Odawara (JP); Takahiro Ibusuki, Tokyo (JP); Yukimasa Okada, Odawara (JP); Norihiro Ookawa, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/066,523

(22) Filed: Oct. 29, 2013

(51) Int. Cl.
    *G11B 5/127* (2006.01)
(52) U.S. Cl.
    USPC ............................................. 360/319
(58) Field of Classification Search
    None
    See application file for complete search history.

(56) References Cited

U.S. PATENT DOCUMENTS

| | | | |
|---|---|---|---|
| 6,449,135 B1 | 9/2002 | Ding et al. | |
| 6,947,261 B2 * | 9/2005 | Terunuma | 360/319 |
| 7,154,714 B2 * | 12/2006 | Fukui et al. | 360/324.12 |
| 7,231,705 B2 * | 6/2007 | Kagami et al. | 29/603.15 |
| 7,446,987 B2 | 11/2008 | Zhang et al. | |
| 7,468,870 B2 * | 12/2008 | Arasawa et al. | 360/324.12 |
| 8,107,201 B2 | 1/2012 | Zhang et al. | |
| 8,203,809 B2 | 6/2012 | Zhou et al. | |
| 8,284,526 B2 | 10/2012 | Nishioka et al. | |
| 2004/0047087 A1 * | 3/2004 | Fukui et al. | 360/324.12 |
| 2006/0158793 A1 * | 7/2006 | Arasawa et al. | 360/324.12 |
| 2007/0274011 A1 * | 11/2007 | Ohta et al. | 360/328 |
| 2012/0161263 A1 | 6/2012 | Maat et al. | |
| 2012/0231298 A1 | 9/2012 | Singh et al. | |

OTHER PUBLICATIONS

Jung et al., "Magnetic domain-free hard-magnet-biased soft magnetic underlayers for perpendicular media," Journal of Applied Physics, vol. 99, 2006, pp. 08Q901/1-08Q901/3.

Tanahashi et al., "Exchange-biased soft underlayers for perpendicular recording," IEEE Transactions on Magnetics, vol. 41, No. 2, Feb. 2005, pp. 577-580.

* cited by examiner

Primary Examiner — Allen T Cao
(74) Attorney, Agent, or Firm — Zilka-Kotab, PC

(57) ABSTRACT

In one embodiment, a magnetic head includes a lower shield, a read element positioned above the lower shield at a media-facing surface of the magnetic head, the read element having a free layer, an upper shield positioned above the read element, a first domain control layer having a direction of magnetization in a predetermined direction, the first domain control layer being configured to control a direction of magnetization of the free layer toward the predetermined direction, and a second domain control layer configured to have a magnetization in a same direction as the direction of magnetization of the first domain control layer, the second domain control layer being positioned above the first domain control layer, wherein the first domain control layer is a hard magnetic layer, and wherein the second domain control layer is a soft magnetic layer.

20 Claims, 7 Drawing Sheets

MAGNETIC HEAD HAVING TWO DOMAIN CONTROL LAYERS FOR STABILIZING MAGNETIZATION OF THE HARD BIAS LAYER

FIELD OF THE INVENTION

The present invention relates to magnetic heads, and more particularly, this invention relates to a magnetic head having two domain control layers for stabilizing the magnetization of the hard bias layer.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

As a technique for narrowing the spacing between elements of a magnetic head down to a few nanometers, thermal fly-height control (TFC) has been used where part of the media-facing surface of a read or write element is deliberately made to project due to thermal expansion caused by a heating element. This increases the risk of contact between the read or write element and the magnetic disk surface, so magnetic, thermal, and mechanical stress tend to be increased compared with conventional magnetic heads. To deal with this, improving stabilization of the magnetic head is beneficial.

In this situation, if some kind of stress acts on the head during operation of the HDD, this may result in read errors. There are various causes of such stress, one of them being changes in the magnetization condition of a hard bias film of the magnetic head, which is part of a read element. The read element in the magnetic head constantly continues to receive magnetic stress from the media and in addition, when a collision with the media occurs, magnetic stress becomes even larger. It is surmised that the direction of magnetization of the hard bias film may change when such a special event occurs. In particular, it is thought that if the hard bias magnetization changes in a vicinity of the read element, this may influence the reading ability of the read element, and thus be associated with read errors. With the reduction in read element size in recent years, the effect of changes in hard bias magnetization has increased, and can no longer be neglected.

The problems associated with the hard bias magnetization changes are not manifested uniformly and it is believed that areas of local weakness (low coercive force) are randomly distributed in the film, due to variability of the grain size and orientation of the magnetic anisotropy. The direction of magnetization of such areas of local weakness may be changed by magnetic field stress in the HDD. Also, the direction of magnetization of the hard bias film near the read element may easily become directed in a direction perpendicular to the media-facing surface, due to the effect of the demagnetizing field produced in an end portion of the hard bias film.

If there are areas of local weakness near the read element, the effects described above may become pronounced, producing changes in the direction or intensity of the bias magnetic field applied to the read element; unfortunately, this is associated with instability of the magnetic field influencing the read element which may cause read errors. Reducing the average grain size of the hard bias film has been considered as one way to solve this problem, since, if the magnitude of the local change of the hard bias film magnetization is made small in relation to the size of the sensor, the effects on the magnetic field influencing the read element may be reduced. However, this method is difficult to adopt, since this method lowers the coercive force of the grains themselves and so impairs their stability with regard to external magnetic fields.

In contrast, increasing the coercive force by increasing the grain size of the hard bias film itself has also been considered. In this case, even if the grain size is increased, some proportion of small grains will always remain in the vicinity of the read element, due to the manufacturing process of the wafer or mechanical grinding processing of the media-facing surface, which results in local areas of low coercive force not being able to be eliminated. Thus, as described above, the problem of hard bias magnetization stabilization is still unsolved.

SUMMARY

In one embodiment, a magnetic head includes a lower shield, a read element positioned above the lower shield at a media-facing surface of the magnetic head, the read element having a free layer, an upper shield positioned above the read element, a first domain control layer having a direction of magnetization in a predetermined direction, the first domain control layer being configured to control a direction of magnetization of the free layer toward the predetermined direction, and a second domain control layer configured to have a magnetization in a same direction as the direction of magnetization of the first domain control layer, the second domain control layer being positioned above the first domain control layer, wherein the first domain control layer is a hard magnetic layer, and wherein the second domain control layer is a soft magnetic layer.

In another embodiment, a magnetic head includes a lower shield, a read element positioned above the lower shield at a media-facing surface of the magnetic head, the read element including: a first magnetic layer, a second magnetic layer positioned above the first magnetic layer, and a spacer layer positioned between the first magnetic layer and the second magnetic layer, an upper shield positioned above the read element, a first domain control layer having a direction of magnetization in a predetermined direction, the first domain control layer being configured to control a direction of magnetization of the first and second magnetic layers toward the predetermined direction, wherein the first domain control layer is positioned behind the read element in an element height direction perpendicular to the media-facing surface of the magnetic head and separated from the read element by a first insulating layer, and a second domain control layer configured to have a magnetization in a same direction as the direction of magnetization of the first domain control layer, the second domain control layer being positioned above the first domain control layer.

In yet another embodiment, a method for forming a magnetic head includes forming a lower shield, forming a read element above the lower shield at a media-facing surface of the magnetic head, forming an upper shield positioned above the read element, forming a first insulating layer above the lower shield and on sides of the read element, forming a first domain control layer above the first insulating layer, the first domain control layer having a direction of magnetization in a predetermined direction, and forming a second domain control layer above the first domain control layer, the second domain control layer configured to have a magnetization in a same direction as the direction of magnetization of the first domain control layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

Unless otherwise specified herein, the various embodiments may be constructed using conventional materials for each layer, via conventional processes, as would be appreciated by one skilled in the art upon reading the present disclosure.

In one embodiment, a hard bias film in which a direction of magnetization is stabilized, even when areas of low coercive force are present in the hard bias film, is provided in a magnetic head. In order to provide this hard bias film that is stable in regard to one or more external magnetic fields is achieved, according to one embodiment, by assisting any low coercive force areas of the hard bias film by employing a multi-layer bias magnetic film.

In one approach, a first magnetic film acts as a hard bias film with a second magnetic film employing a soft magnetic film that is laminated on the first magnetic film acting to aid the first magnetic film. The static mutual interaction between grains of the first magnetic film is increased by ferromagnetic coupling of the first and second magnetic films, so the coherence length of the multi-layer bias magnetic film as a whole is increased and local areas of low coercive force are assisted by neighboring grains. In this way, localized changes in the direction of magnetization due to external magnetic field stress may be suppressed.

In one general embodiment, a magnetic head includes a lower shield, a read element positioned above the lower shield at a media-facing surface of the magnetic head, the read element having a free layer, an upper shield positioned above the read element, a first domain control layer having a direction of magnetization in a predetermined direction, the first domain control layer being configured to control a direction of magnetization of the free layer toward the predetermined direction, and a second domain control layer configured to have a magnetization in a same direction as the direction of magnetization of the first domain control layer, the second domain control layer being positioned above the first domain control layer, wherein the first domain control layer is a hard magnetic layer, and wherein the second domain control layer is a soft magnetic layer.

In another general embodiment, a magnetic head includes a lower shield, a read element positioned above the lower shield at a media-facing surface of the magnetic head, the read element including: a first magnetic layer, a second magnetic layer positioned above the first magnetic layer, and a spacer layer positioned between the first magnetic layer and the second magnetic layer, an upper shield positioned above the read element, a first domain control layer having a direction of magnetization in a predetermined direction, the first domain control layer being configured to control a direction of magnetization of the first and second magnetic layers toward the predetermined direction, wherein the first domain control layer is positioned behind the read element in an element height direction perpendicular to the media-facing surface of the magnetic head and separated from the read element by a first insulating layer, and a second domain control layer configured to have a magnetization in a same direction as the direction of magnetization of the first domain control layer, the second domain control layer being positioned above the first domain control layer.

In yet another general embodiment, a method for forming a magnetic head includes forming a lower shield, forming a read element above the lower shield at a media-facing surface of the magnetic head, forming an upper shield positioned above the read element, forming a first insulating layer above the lower shield and on sides of the read element, forming a first domain control layer above the first insulating layer, the first domain control layer having a direction of magnetization in a predetermined direction, and forming a second domain control layer above the first domain control layer, the second domain control layer configured to have a magnetization in a same direction as the direction of magnetization of the first domain control layer.

Figure 1:
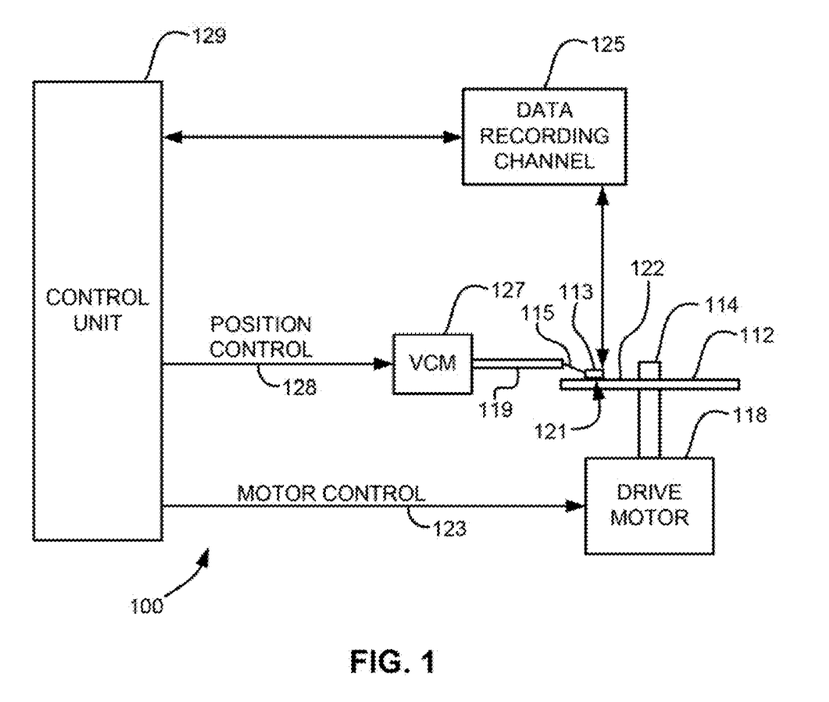
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
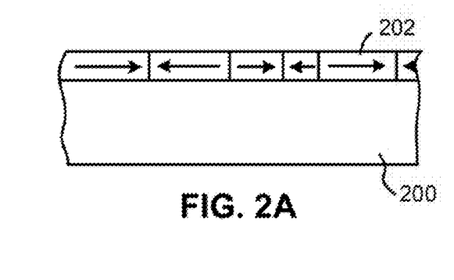
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating of a suitable and conventional magnetic layer.

Figure 2B:
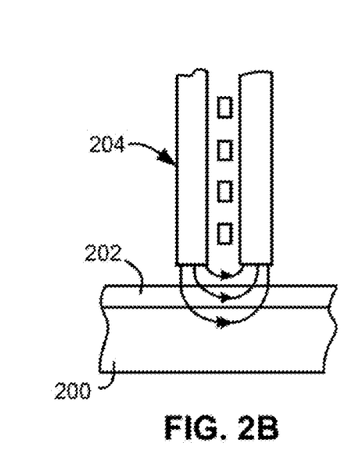
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
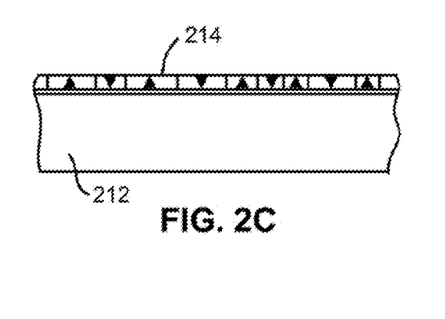
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
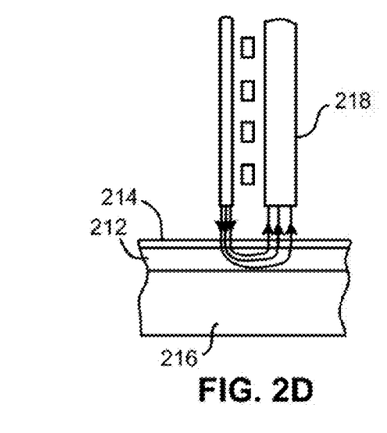
FIG. 2D is a schematic representation of a recording head and recording medium combination for perpendicular recording on one side.

FIG. 2D illustrates the operative relationship between a perpendicular head and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating of magnetic material preferably having a high coercivity relative to the under layer in the form of magnetic impulses having their axes of magnetization substantially perpendicular to the surface of the medium. The flux is channeled by the soft underlying coating 212 back to the return layer (P1) of the head 218.

Figure 2E:
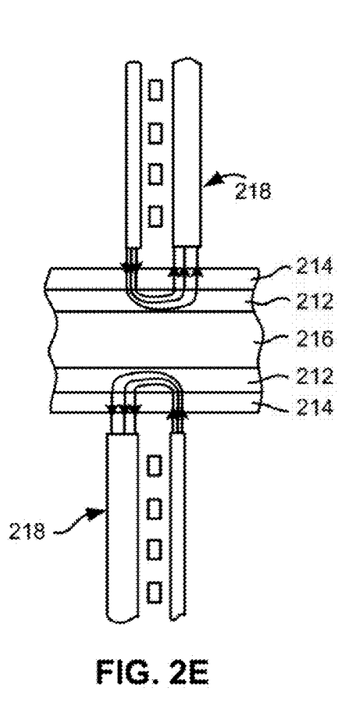
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
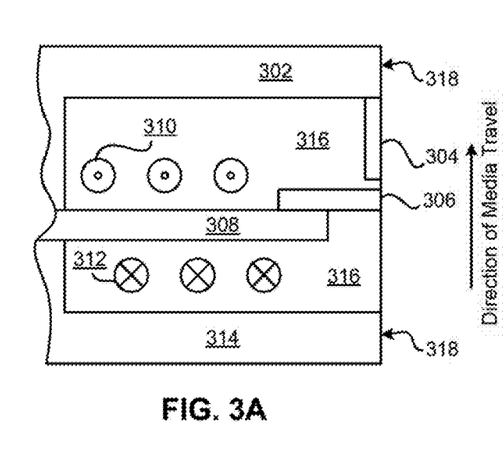
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
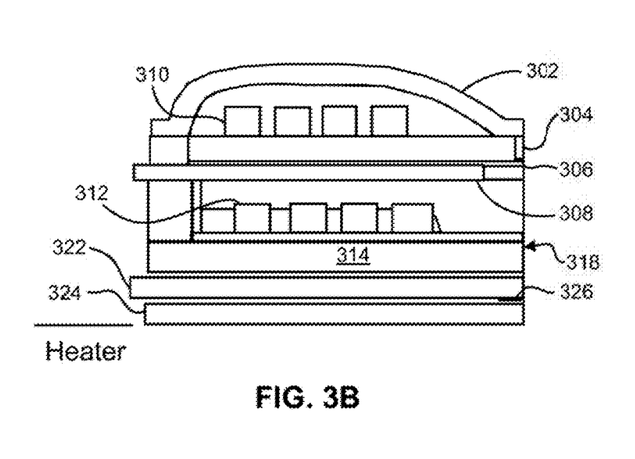
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
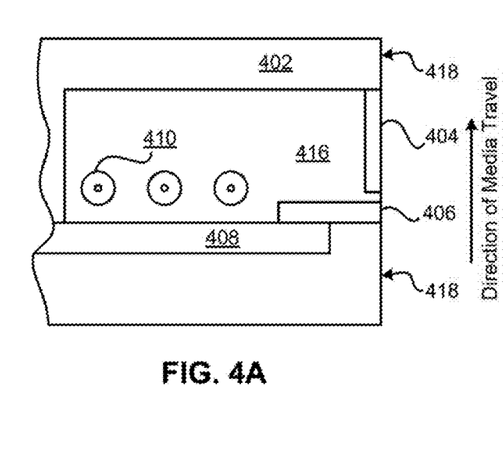
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
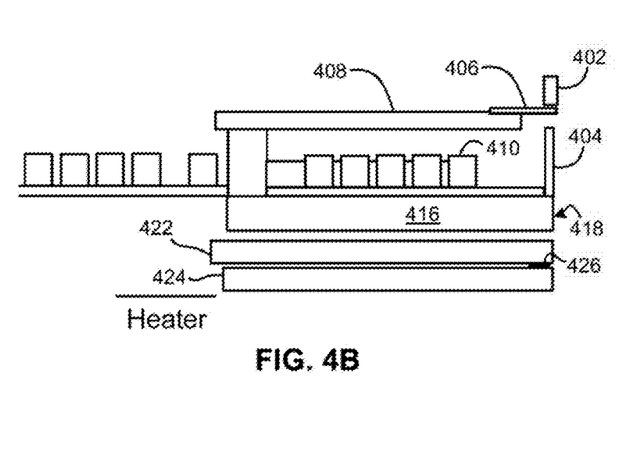
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
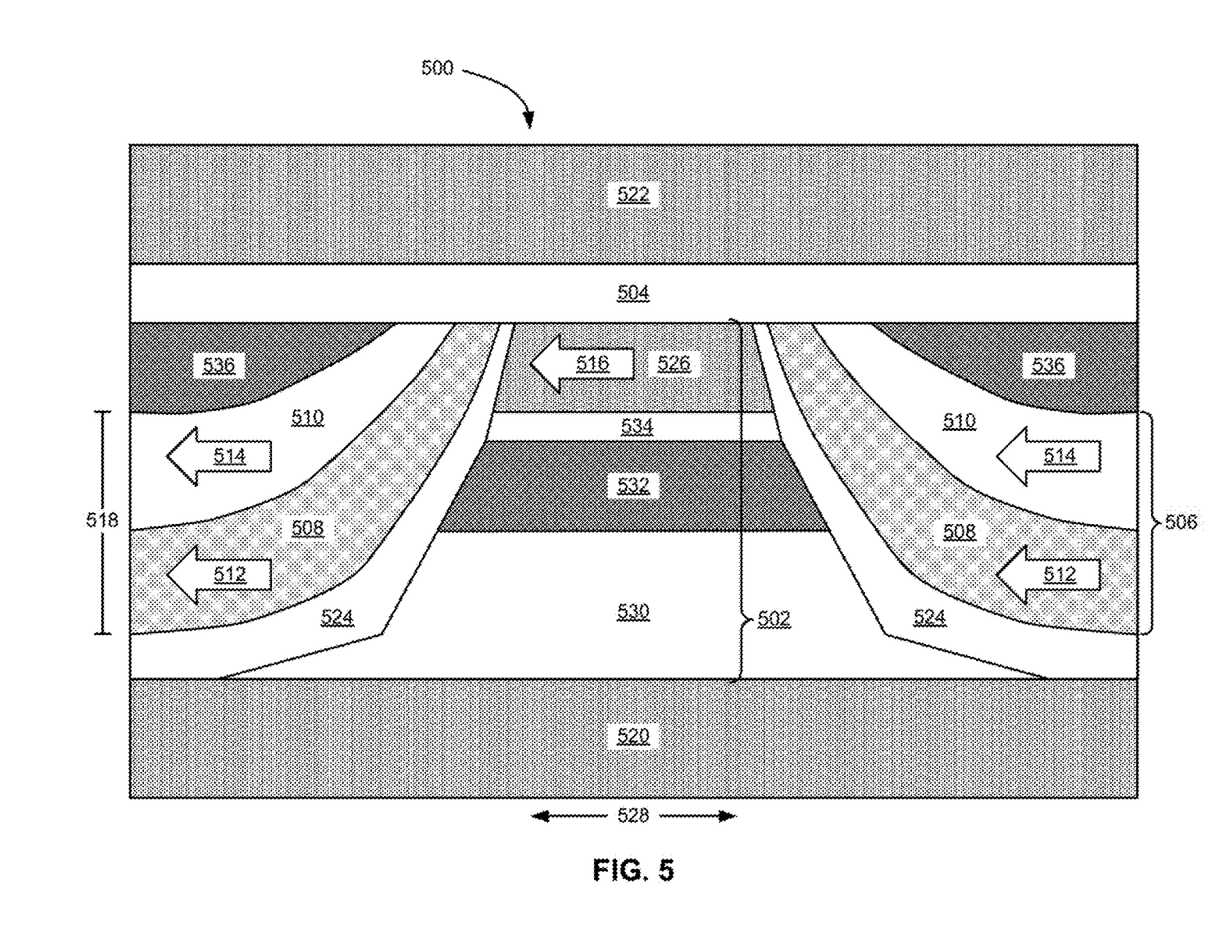
FIG. 5 shows a magnetic head according to one embodiment.

FIG. 5 depicts a magnetic head 500, in accordance with one embodiment. As an option, the present magnetic head 500 may be implemented in conjunction with features from any other embodiment listed herein, such as those described with reference to the other Figures. Of course, however, such magnetic head 500 and others presented herein may be used in various applications and/or in permutations which may or may not be specifically described in the illustrative embodiments listed herein. Further, the magnetic head 500 presented herein may be used in any desired environment.

Referring to FIG. 5, a magnetic head 500 is shown from a media-facing surface thereof, according to one embodiment. The magnetic head 500 may comprise a lower shield 520, a read element 502 (which may be a magnetoresistive element in one approach) which comprises a free layer 526 and is positioned above the lower shield 520 at a media-facing surface of the magnetic head 500, an upper shield 522 positioned above the read element 502, a first domain control layer 508 (which may be a first magnetic layer and/or a hard bias magnetic film) having a direction of magnetization 512 in a predetermined direction, and a second domain control layer 510 positioned above the first domain control layer 508.

The first domain control layer 508 is configured to control (bias) a direction of magnetization 516 of the free layer 526 toward the predetermined direction. Furthermore, the first domain control layer 508 is positioned above a first insulating layer 524 and separated from the free layer 526 at both sides thereof in a cross-track direction 528 by the first insulating layer 524.

The second domain control layer 510 is configured to have a magnetization in a same direction as the direction of magnetization 512 of the first domain control layer 508.

In one embodiment, the magnetic head 500 may further comprise a write element (not shown—which may be an inductive recording element in one approach) positioned above a non-magnetic conductive layer 504 at the media-facing surface of the magnetic head 500.

In another embodiment, a non-magnetic layer 536 may be positioned above a portion of the second domain control layer 510 between the second domain control layer and the non-magnetic conductive layer 504. This non-magnetic layer 536 may comprise any suitable material known in the art, including any of those specifically described herein, among others.

In another embodiment, the first domain control layer 508 may be a hard magnetic layer and the second domain control layer 510 may be a soft magnetic layer, as would be understood by one of skill in the art (e.g., comprising a hard or soft magnetic material, respectively). In general, a hard magnetic material is one in which the magnetic orientation is generally unaffected by external magnetic fields at room temperature, while the magnetic orientation of a soft magnetic material is affected by such external magnetic fields.

Furthermore, in one approach, the first domain control layer 508 may comprise CoCrPt, CoPt, or the like, and the second domain control layer 510 may comprise one or more layers of NiFe, CoFe, or a combination thereof, such as in a laminated structure.

In another approach, a ratio of a film thickness of the first domain control layer 508 to a film thickness of the second domain control layer 510 may be from about 4:1 to about 3:2. For example, when the film thickness of the first domain control layer is about 12 nm, the film thickness of the second domain control layer 510 may be from about 3 nm to about 8 nm. In another example, when the film thickness of the second domain control layer 510 is about 10 nm, the film thickness of the first domain control layer 508 may be from about 15 nm to about 40 nm. Of course, other thicknesses are possible as long as the ratio of thicknesses is maintained, as is described in more detail later.

The read element 502, in one approach, may further comprise an antiferromagnetic layer 530 positioned above the lower shield 520, a fixed magnetic layer positioned above the antiferromagnetic layer 530, a spacer layer 534 positioned above the fixed magnetic layer 532, and the free layer 526 positioned above the spacer layer 534. The spacer layer 534 may be a tunnel barrier layer of a type known in the art when the read element is a tunneling magnetoresistive (TMR) sensor, a nonmagnetic spacer layer of a type known in the art when the read element is of another type such as AMR, GMR, etc.

Figure 6:
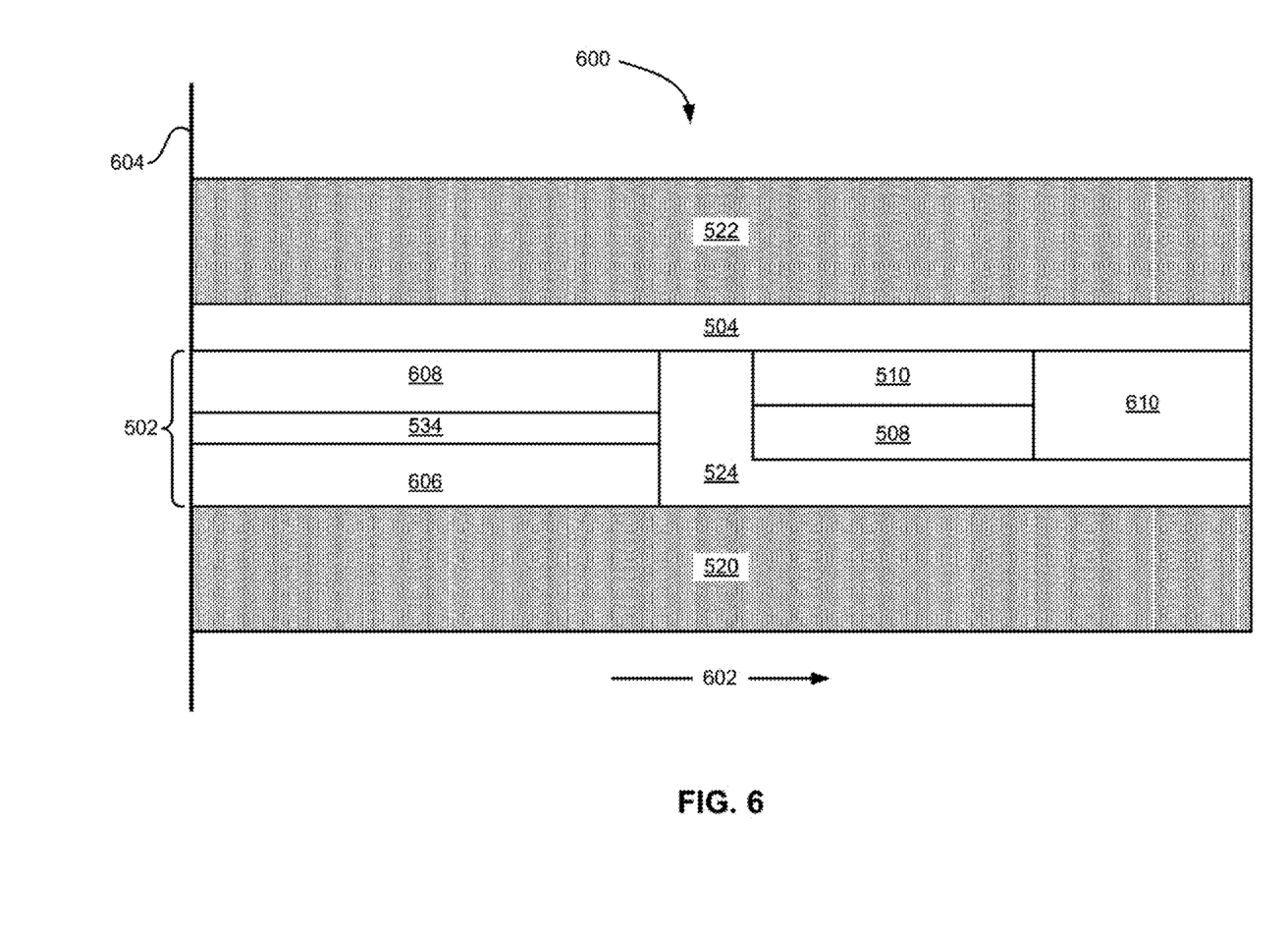
FIG. 6 shows a magnetic head according to another embodiment.

FIG. 6 depicts a device 600, in accordance with one embodiment. As an option, the present device 600 may be implemented in conjunction with features from any other embodiment listed herein, such as those described with reference to the other FIGS. Of course, however, such device 600 and others presented herein may be used in various applications and/or in permutations which may or may not be specifically described in the illustrative embodiments listed herein. Further, the device 600 presented herein may be used in any desired environment.

As shown in FIG. 6, according to another embodiment, a first domain control layer 508 and a second domain control layer 510 may be positioned behind a read element 502 in an element height direction 602 perpendicular to the media-facing surface of a magnetic head 600 and separated from the read element 502 by a first insulating layer 524. Furthermore, in this embodiment, the read element 502 may comprise a first magnetic layer 606, a second magnetic layer 608 positioned above the first magnetic layer 606, and a spacer layer 534 positioned between the first magnetic layer 606 and the second magnetic layer 608. Note that an antiferromagnetic layer may or may not be present. No antiferromagnetic layer is shown in the embodiment of FIG. 6. The magnetic head 600 may also comprise another insulating layer 610 positioned behind the first domain control layer 508 and the second domain control layer 510 in the element height direction 602, which may comprise a same or different material as the first insulating layer 524.

In this embodiment, just as in the magnetic head 500 shown in FIG. 5, even when areas of low coercive force are locally present in the hard magnetic film 508, mutual interaction between the grains of the hard magnetic film 508 is reinforced by the provision of the laminated soft magnetic film 510, so the direction of magnetization 512 thereof may be stabilized.

As shown in FIGS. 5-6, a hard bias film 506 may be formed by laminating a second magnetic film 510 (which may comprise a soft magnetic material) above or directly in contact with a first magnetic film 508 (which may comprise a hard magnetic material). In this way, a direction of magnetization 512 of the first magnetic film 508 may be stabilized via ferromagnetic coupling, even when portions of low coercive force are present in the first magnetic film 508 due to defective portions thereof (or some other reason).

In one embodiment, the direction of magnetization 512 may be a hard bias magnetic field that is configured to control a direction of magnetization 516 of the one or more portions of the read element 502 (such as the free layer 526 or multiple portions like a first magnetic film and second magnetic film therein).

In this way, stable operation of a HDD may be achieved even when the magnetic head is exposed to a stressing magnetic field, without changing a hard bias magnetic field 512 applied to the read element 502. Also, since this may be implemented via a laminated structure, there is little effect on the overall film thickness 518 of the hard bias film 506, making it possible to cope with future demands for narrowing the spacing therebetween in regard to the magnetic head structure.

The second magnetic film 510 may comprise a soft magnetic film which may comprise NiFe, CoFe, or a combination thereof (or some other suitable soft magnetic material known in the art) in various embodiments. Furthermore, the first magnetic film may comprise a hard magnetic film which may comprise CoCrPt, CoPt, or a combination thereof (or some other suitable hard magnetic material known in the art), thereby producing ferromagnetic coupling of the hard magnetic film 508 with the soft magnetic film 510 in various embodiments. In this way, a direction of magnetization 512 of the hard magnetic film 508 and a direction of magnetization 514 of the soft magnetic film 510 may normalize to become the same direction. Even if there are local areas of low coercive force in the hard magnetic film 508, because the soft magnetic film 510 is laminated thereon, mutual interaction between the grains of the hard magnetic film 508 is reinforced, making it possible to stabilize their direction.

Due to limitations in lamination processes generally, the possibility of misalignment of the soft magnetic film 510 above the hard magnetic film 508 should be considered. When the distance that the layers are offset is too great, any beneficial effect from having the multi-layers is attenuated, so preferably a distance between the hard magnetic film 508 and soft magnetic film 510 near the read element 502 is no more than about 40 nm. The term "near to" indicates the closest position of the hard magnetic film and the soft magnetic film 510 to the read element 502.

According to testing, in a scenario where a hard magnetic film is employed on its own, attenuation of the hard bias magnetic field may be encountered near or in the vicinity of a stressing magnetic field of about 1000 to about 2000 Oe. In contrast, when a soft magnetic film is laminated thereon, the ability to withstand external magnetic fields (Transverse Field: magnetic field perpendicular to the media-facing surface) is improved.

In addition, four types of heads were manufactured and compared, the heads having different film thickness ratios of the hard magnetic film and soft magnetic film. As a result, it was found that wafers in which a soft magnetic film was laminated on a hard magnetic film showed smaller variability of current than wafers using only a hard magnetic film. This confirmed that use of a laminated or multi-layer bias magnetic layer improved the ability to resist external magnetic fields.

Also, according to the test results, a film thickness ratio of the hard magnetic film to the soft magnetic film may preferably be between about 8:2 to about 6:4, or reduced to 4:1 to 3:2.

Figure 7:
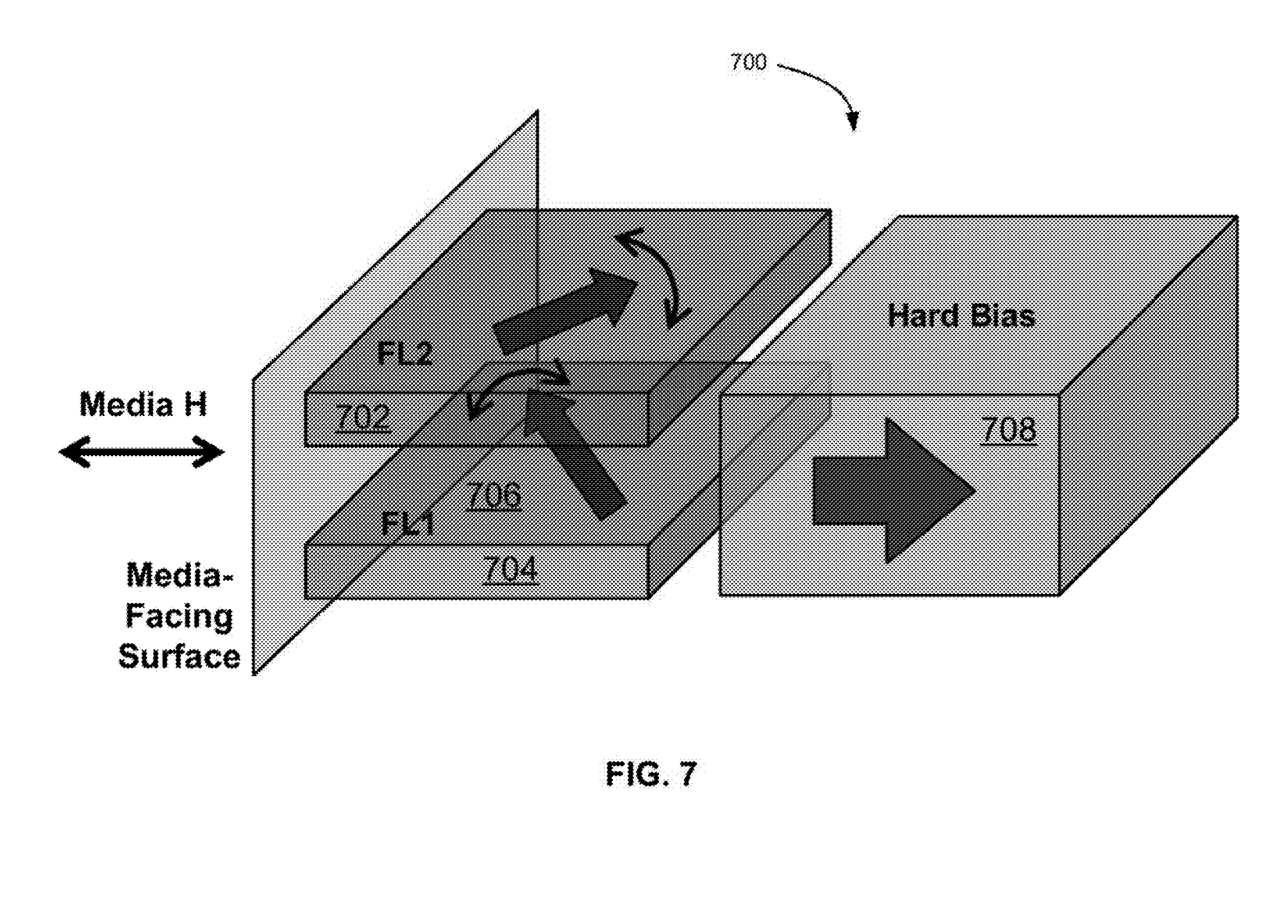
FIG. 7 shows a simplified schematic diagram of a scissors-type magnetic head according to one embodiment.

FIG. 7 is a diagram of a read head 700 employing a read element or sensor generally called a scissors-type sensor.

A scissors-type sensor comprises two magnetic layers 702, 704 sandwiching a non-magnetic intermediate layer 706. When no bias magnetic field is present, the magnetization of these two magnetic layers is exchange-coupled so as to be mutually antiparallel. An initial condition in which the magnetization of these two magnetic layers is inclined by about 45° with respect to a track-width direction is created by the action of a bias magnetic field produced from a permanent magnet 708 arranged at a location on a side opposite the media-facing surface, in the throat-height direction, as seen from the sensor. When a sensor that is in this magnetization condition detects the magnetic signal emanated from the medium, the magnetization direction of the two magnetic layers changes exactly like the action when paper is cut by scissors. As a result, the resistance value of the read element varies, which is able to be monitored to produce a read signal.

Figure 8:
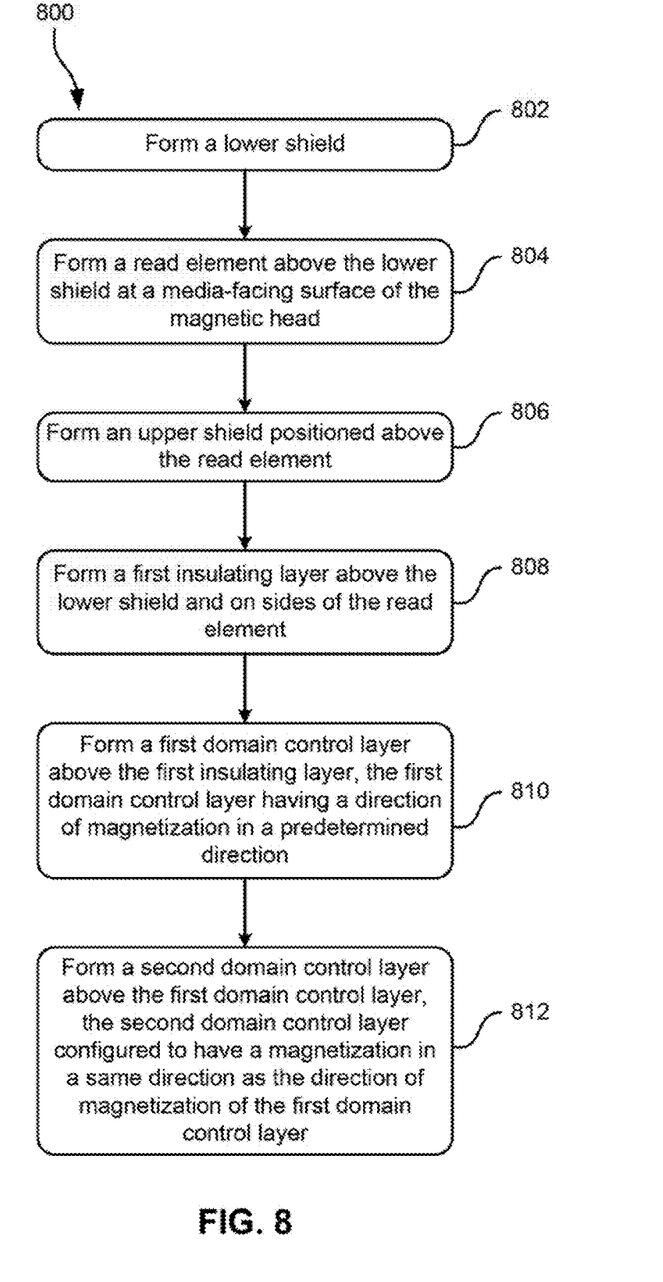
FIG. 8 shows a flowchart of a method according to one embodiment.

Now referring to FIG. 8, a method 800 for forming a magnetic head is shown according to one embodiment. The method 800 may be performed in accordance with the present invention in any of the environments depicted in FIGS. 1-6, among others, in various embodiments. Of course, more or less operations than those specifically described in FIG. 8 may be included in method 800, as would be understood by one of skill in the art upon reading the present descriptions.

Any formation technique may be used to form any of the layers, structures, films, and other components of method 800 described herein, such as sputtering, plating, spin coating, chemical vapor deposition (CVD), atomic layer deposition (ALD), physical vapor deposition (PVD), etc.

Furthermore, any magnetic material may be used to form the magnetic layers described in method 800, such as alloys of Co, Fe, Ni, and/or Pt, or any other suitable materials known in the art.

The method 800 may begin with operation 802, where a lower shield is formed. Any of the previously described materials may be used to form the lower shield or others known in the art. In one embodiment, the lower shield may be formed above a substrate, such as a glass substrate, or some other layer already formed of a magnetic head.

In operation 804, a magnetoresistive element is formed above the lower shield at a media-facing surface of the magnetic head. The magnetoresistive element may be formed using any technique known in the art, and one or more masking, planarizing, and/or removal processes may be carried out in formation of the magnetoresistive element as would be understood by one of skill in the art upon reading the present descriptions.

According to one embodiment, the magnetoresistive element may comprise an antiferromagnetic layer positioned above the lower shield, a fixed magnetic layer positioned above the antiferromagnetic layer, an insulating layer positioned above the fixed magnetic layer, and a free layer positioned above the insulating layer. In this embodiment, the first domain control layer is separated from both sides of the magnetoresistive element in a cross-track direction by the first insulating layer, and the first domain control layer is configured to control a direction of magnetization of the free layer toward the predetermined direction.

According to another embodiment, the magnetoresistive element may comprise a first magnetic layer, a second magnetic layer positioned above the first magnetic layer, and a spacer layer positioned between the first magnetic layer and the second magnetic layer. In this embodiment, the first domain control layer is formed behind the magnetoresistive element in an element height direction perpendicular to the media-facing surface of the magnetic head and separated from the magnetoresistive element by the first insulating layer, and the first domain control layer is configured to control a direction of magnetization of the first and second magnetic layers toward the predetermined direction.

In operation 806, a first insulating layer is formed above the lower shield and on sides of the magnetoresistive element. The first insulating layer may comprise any suitable electrically and/or magnetically insulating material known in the art, such as alumina, MgO, etc.

In operation 808, an upper shield is formed above the magnetoresistive element (and above the first insulating layer). The upper shield may comprise any of the previously described materials and may be formed using any available technique known in the art may.

In operation 810, a first domain control layer is formed above the first insulating layer using any suitable formation technique known in the art. The first domain control layer has a direction of magnetization in a predetermined direction that is capable of influencing the direction of magnetization of one or more other layers in the magnetic head.

In operation 812, a second domain control layer is formed above the first domain control layer using any suitable formation technique known in the art. The second domain control layer is configured to have a magnetization in a same direction as the direction of magnetization of the first domain control layer.

In one embodiment, method 800 may further comprise forming a write element (such as an inductive recording element) above a non-magnetic conductive layer positioned above the read element and below the upper shield at the media-facing surface of the magnetic head. The write element may comprise any suitable layers and may be formed using any technique known in the art, such that the write element is capable of producing a magnetic field to write data to a magnetic medium positioned near to a media-facing surface of the write element.

In another embodiment, the first domain control layer may be a hard magnetic layer and the second domain control layer may be a soft magnetic layer, as would be understood by one of skill in the art upon reading the present descriptions.

Furthermore, in some approaches, the first domain control layer may comprise CoCrPt and the second domain control layer may comprise one or more layers of NiFe, CoFe, or a combination thereof.

In addition, in one approach, a ratio of a film thickness of the first domain control layer to a film thickness of the second domain control layer may be from about 4:1 to about 3:2.

In some approaches, a magnetic head as shown in FIG. 5 may be used in a magnetic data storage system. The magnetic data storage system may be similar to that shown in FIG. 1. For example, the magnetic data storage system 100 may comprise at least one magnetic head 121 as described according to any embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a lower shield;
   a read element positioned above the lower shield at a media-facing surface of the magnetic head, the read element comprising a free layer;
   an upper shield positioned above the read element;
   a first domain control layer having a direction of magnetization in a predetermined direction, the first domain control layer being configured to control a direction of magnetization of the free layer toward the predetermined direction; and
   a second domain control layer configured to have a magnetization in a same direction as the direction of magnetization of the first domain control layer, the second domain control layer being positioned above the first domain control layer,
   wherein the first domain control layer is a hard magnetic layer, and wherein the second domain control layer is a soft magnetic layer.

2. The magnetic head as recited in claim 1, wherein the read element comprises:
   an antiferromagnetic layer positioned above the lower shield;
   a fixed magnetic layer positioned above the antiferromagnetic layer;
   a spacer layer positioned above the fixed magnetic layer; and
   the free layer positioned above the spacer layer, and
   wherein the second domain control layer is positioned directly on the first domain control layer.

3. The magnetic head as recited in claim 1, further comprising a write element positioned above a non-magnetic conductive layer at the media-facing surface of the magnetic head, the non-magnetic conductive layer being positioned above the read element and below the upper shield.

4. The magnetic head as recited in claim 1, wherein the first domain control layer is positioned above a first insulating layer and separated from the free layer at both sides thereof in a cross-track direction by the first insulating layer.

5. The magnetic head as recited in claim 1, wherein the first domain control layer comprises CoCrPt and wherein the second domain control layer comprises one or more layers of NiFe, CoFe, or a combination thereof.

6. The magnetic head as recited in claim 1, wherein a ratio of a film thickness of the first domain control layer to a film thickness of the second domain control layer is from about 4:1 to about 3:2.

7. The magnetic head as recited in claim 1, wherein the first domain control layer and the second domain control layer are positioned behind the read element in an element height direction perpendicular to the media-facing surface of the magnetic head and separated from the read element by the first insulating layer.

8. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

9. A magnetic head comprising:
   a lower shield;
   a read element positioned above the lower shield at a media-facing surface of the magnetic head, the read element comprising:
     a first magnetic layer;
     a second magnetic layer positioned above the first magnetic layer, and
     a spacer layer positioned between the first magnetic layer and the second magnetic layer;
   an upper shield positioned above the read element;
   a first domain control layer having a direction of magnetization in a predetermined direction, the first domain control layer being configured to control a direction of magnetization of the first and second magnetic layers toward the predetermined direction, wherein the first domain control layer is positioned behind the read element in an element height direction perpendicular to the media-facing surface of the magnetic head and separated from the read element by a first insulating layer; and
   a second domain control layer configured to have a magnetization in a same direction as the direction of magnetization of the first domain control layer, the second domain control layer being positioned above the first domain control layer,
   wherein the first domain control layer is further positioned at both sides of the first and second magnetic layers in a cross-track direction and separated therefrom by the first insulating layer, and
   wherein the second domain control layer is positioned above the first domain control layer at both sides of the first and second magnetic layers in the cross-track direction.

10. The magnetic head as recited in claim 9, wherein the first domain control layer is a hard magnetic layer and the second domain control layer is a soft magnetic layer.

11. The magnetic head as recited in claim 9, wherein the first domain control layer comprises CoCrPt and the second domain control layer comprises one or more layers of NiFe, CoFe, or a combination thereof, and wherein the second domain control layer is positioned directly on the first domain control layer.

12. The magnetic head as recited in claim 9, wherein a ratio of a film thickness of the first domain control layer to a film thickness of the second domain control layer is from about 4:1 to about 3:2.

13. The magnetic head as recited in claim 9, wherein a combined thickness of the first and second domain control layers is greater than a combined thickness of the first magnetic layer, the second magnetic layer, and the spacer layer.

14. A magnetic data storage system, comprising:
   at least one magnetic head as recited in claim 9;
   a magnetic medium;
   a drive mechanism for passing the magnetic medium over the at least one magnetic head; and
   a controller electrically coupled to the at least one magnetic head for controlling operation of the at least one magnetic head.

15. A method for forming a magnetic head, the method comprising:
   forming a lower shield;
   forming a read element above the lower shield at a media-facing surface of the magnetic head;
   forming an upper shield positioned above the read element;
   forming a first insulating layer above the lower shield and on sides of the read element in a cross-track direction;
   forming a first domain control layer above the first insulating layer and on sides of the read element in the cross-track direction, the first domain control layer having a direction of magnetization in a predetermined direction; and
   forming a second domain control layer directly on the first domain control layer and on sides of the read element in the cross-track direction, the second domain control layer configured to have a magnetization in a same direction as the direction of magnetization of the first domain control layer.

16. The method as recited in claim 15, wherein the read element comprises:
   an antiferromagnetic layer positioned above the lower shield;
   a fixed magnetic layer positioned above the antiferromagnetic layer;
   a spacer layer positioned above the fixed magnetic layer; and
   a free layer positioned above the spacer layer,
   wherein the first domain control layer is separated from both sides of the read element in a cross-track direction by the first insulating layer, and wherein the first domain control layer is configured to control a direction of magnetization of the free layer toward the predetermined direction.

17. The method as recited in claim 15, wherein the read element comprises:
- a first magnetic layer,
- a second magnetic layer positioned above the first magnetic layer, and
- a spacer layer positioned between the first magnetic layer and the second magnetic layer,
- wherein the first domain control layer is formed behind the read element in an element height direction perpendicular to the media-facing surface of the magnetic head and separated from the read element by the first insulating layer, and
- wherein the first domain control layer is configured to control a direction of magnetization of the first and second magnetic layers toward the predetermined direction.

18. The method as recited in claim 15, further comprising forming a write element above a non-magnetic conductive layer at the media-facing surface of the magnetic head, wherein the non-magnetic conductive layer is formed above the read element and below the upper shield.

19. The method as recited in claim 15, wherein the first domain control layer is a hard magnetic layer and wherein the second domain control layer is a soft magnetic layer.

20. The method as recited in claim 19, wherein the first domain control layer comprises CoCrPt and wherein the second domain control layer comprises one or more layers of NiFe, CoFe, or a combination thereof, and wherein a ratio of a film thickness of the first domain control layer to a film thickness of the second domain control layer is from about 4:1 to about 3:2.

* * * * *

UNITED STATES PATENT AND TRADEMARK OFFICE
CERTIFICATE OF CORRECTION

PATENT NO. : 8,976,492 B1  
APPLICATION NO. : 14/066523  
DATED : March 10, 2015  
INVENTOR(S) : Kouji Kataoka et al.

It is certified that error appears in the above-identified patent and that said Letters Patent is hereby corrected as shown below:

In the specification:

col. 5, line 63 replace "heads by" with --heads 121 by--;  
col. 6, line 35 replace "coating of" with --coating 202 of--;  
col. 6, line 50 replace "head and" with --head 218 and--;  
col. 6, line 65 replace "coating of" with --coating 214 of--;  
col. 6, line 66 replace "layer in" with --layer 212 in--;  
col. 8, line 24 replace "magnetization in" with --magnetization 514 in--;  
col. 8, line 33 replace "layer and" with --layer 510 and--;  
col. 8, line 55 replace "layer is" with --layer 508 is--;  
col. 8, line 65 replace "layer positioned" with --layer 532 positioned--;  
col. 9, line 21 replace "surface of" with --surface 604 of--;  
col. 10, line 2 replace "film may" with --film 508 may--;  
col. 10, line 23 replace "film and" with --film 508 and--.

In the claims:

col. 12, line 54 replace "layer," with --layer;--;  
col. 15, line 6 replace "layer," with --layer;--;  
col. 15, line 8 replace "layer," with --layer;--.

Signed and Sealed this  
Fourteenth Day of July, 2015

Michelle K. Lee  
*Director of the United States Patent and Trademark Office*